(12) United States Patent
Porte

(10) Patent No.: US 7,461,029 B2
(45) Date of Patent: Dec. 2, 2008

(54) METHOD FOR CLUSTERED DATA TRANSMISSION

(75) Inventor: Patrice Porte, Paris (FR)

(73) Assignee: GL Trade, Paris (FR)

( * ) Notice: Subject to any disclaimer, the term of this patent is extended or adjusted under 35 U.S.C. 154(b) by 0 days.

(21) Appl. No.: 11/642,952

(22) Filed: Dec. 21, 2006

(65) Prior Publication Data

US 2007/0156593 A1    Jul. 5, 2007

(30) Foreign Application Priority Data

Dec. 21, 2005    (FR) .................................... 05 13044

(51) Int. Cl.
*G06F 17/60*    (2006.01)
(52) U.S. Cl. .......................................... 705/51; 705/52
(58) Field of Classification Search .................... 705/51, 705/52
See application file for complete search history.

(56) References Cited

U.S. PATENT DOCUMENTS 6,574,742 B1    6/2003    Jamroga et al.

2002/0188665 A1    12/2002    Lash
2007/0073845 A1*    3/2007    Reisman ..................... 709/219

FOREIGN PATENT DOCUMENTS

| EP | 1 533 695 | | 5/2005 |
|----|-----------|---|--------|
| FR | 2 755 559 | | 5/1998 |
| JP | 2002094710 A | * | 3/2002 |

OTHER PUBLICATIONS

French Patent Office, Preliminary Search Report issued Sep. 26, 2006 with respect to French Patent Application No. 0513044, filed Dec. 21, 2005.

* cited by examiner

*Primary Examiner*—Pierre E Elisca
(74) *Attorney, Agent, or Firm*—Blank Rome LLP

(57) ABSTRACT

The present invention relates to the field of data transmission from a server to a remote workstation. According to the present invention, data is grouped into groups of data and, by merely comparing group identifiers, only the contents of the groups modified by an update are sent to the remote workstation. The method makes it possible to avoid sending the contents of groups of data that have not been modified, and thereby reduces the amount of data transmitted, while transmitting the relevant update information.

1 Claim, 3 Drawing Sheets

METHOD FOR CLUSTERED DATA TRANSMISSION

BACKGROUND OF THE INVENTION

The present invention relates to the field of data transmissions from a server to a remote workstation. It relates, more particularly, to such a transmission in the case of a considerable amount of data that requires updating.

This type of transmission is, for example, common in the field of computerised stock market tools. In this field, distribution servers regularly transmit update data received by the stock market or markets, and must transmit these data in order for the server clients to be able to react to the stock market updates.

And yet, at present, the amount of information to be transmitted to the clients in the field of the stock market is so large that it is advantageous to perform these transmissions in an efficient manner.

In the field of databases, such a problem can appear in the transmission of large amounts of information. And yet, databases traditionally use persistent storage of data, which is to say that when the value of data is updated in an instant T, its value in the instant T−1 is not lost, remaining stored in the database.

This type of persistent storage makes it possible, in particular, easily to detect whether the value of data has been updated or not by comparing its values in the instant T and in the instant T−1 in the database. If these two values are different, the new value can be transmitted to remote clients for update purposes.

On the other hand, in the field of the stock market, the data are stored in a distribution server in a non-persistent manner, which is to say that when the value of data is updated, its preceding value is deleted from the database.

It is not therefore possible to detect updates by simply comparing the values of the data at two different times.

In order to transmit the data updates to a distribution server, a known solution consists of transmitting the entire contents of the server, either regularly or at the request of the remote client.

However, this solution is not efficient since, of all the data transmitted, some will not have been updated and do not a priori require a new transmission.

In the case of a considerable amount of data, this lack of efficiency evidently produces complications in terms of bandwidth and sending time.

Document FR-2 755 559 refers to the problem of bandwidth size mentioned previously. This document mentions, in particular, that the bandwidth is used better and the sending time is reduced only if the variable data are transmitted. The method described in document D1 compares the stored data with the data to be transmitted, and only transmits the data that are different. This method needs to compare the data one by one, which slows down the update process.

Document US-2002/188665 describes a method aiming to update data transmission programs in an efficient manner, which aims to execute a content update version differentiation algorithm on the subscriber side. According to the described method, a binary update file is produced, which identifies steps that make it possible to update the information. The method is implemented in order to update data update programs, and not the actual data.

The same applies to the method described in document EP-1 533 695. This method relates to updating the programs used in mobile phones or other personal digital assistants. In order to reduce the size of the transmitted update files, the document suggests loading update instructions and generating update data from data stored in the mobile phone and a series of instructions.

Document U.S. Pat. No. 6,574,742 relates to the creation of a medical database comprising all the information relating to several patients, including information such as X-rays presented in the form of images. The problems set forth in this document relate to the confidentiality of the transmitted data, the conversion of film or photos into digital format for storing them, the storage of data and the reduction of image storage costs. In order to reduce the size of the transmitted data flow, the data are compressed.

Since data updates are a particularly important problem in the field of the stock market, it is therefore advantageous to improve the efficiency of data transmissions from a data server providing non-persistent data storage to a remote client.

BRIEF SUMMARY OF THE INVENTION

For this purpose, the present invention relates to a data management method using a data distribution server linked to a remote workstation, said distribution server comprising a first set of data, each of said data being associated with a data identifier and at least one attribute, said method comprising:
  a sending step consisting of
    grouping the data of said first set of data into at least one group of data according to said data identifier of each of said data of said first set of data;
    calculating, for each of said at least one group of data, one group identifier, according to said at least one attribute of each of said data grouped together inside said group of data;
    transmitting the data of each of said groups of data as well as each of said group identifiers to said remote workstation;
  an update step consisting of:
    receiving a second set of data to update said first set of data in said distribution server, each of said update data being associated with a data identifier and at least one attribute;
    grouping the data of said second set of update data in said at least one group of data according to said data identifier of each of said data of said second set;
    calculating, for each of said at least one group of data, an updated group identifier according to said at least one attribute of each of said update data grouped together inside said group of data;
  a step of comparison, comprising the following sub-steps:
    transmitting, from said remote workstation to said distribution server, each of said data group identifiers received by said remote workstation during said sending step;
    comparing, by said distribution server, for each group of data, said data group identifier associated with said group of data with said updated data group identifier, associated with said group of data;
    transmitting, from said distribution server to said remote workstation, the contents of the group of data for which the data group identifier is different to the updated data group identifier.

In this way, by means of grouping the data into groups of data and by merely comparing the group identifiers, only the contents of the groups modified by an update are sent to the remote workstation.

This method therefore makes it possible to avoid sending the contents of groups of data that have not been modified, and thereby to reduce the amount of data transmitted, while transmitting the relevant update information.

In the field of the stock market, the data transmitted by the method are, for example, stock market values, identified by a lexicographic code, which can take on values ranging, for example, from AA to ZZ.

In this case, the groups are preferably formed following a lexicographic order, grouping the values according to this lexicographic code with, for example, a first group of values in which the code ranges from AA to GZ, a second group of values in which the code ranges from HA to MZ, a third group of values in which the code ranges from NA to TZ, and a fourth group of values in which the code ranges from UA to ZZ. It is, however, understood that the distribution of the values can be carried out by different reproducible grouping means other than simple lexicographic sorting.

In this case, for each of the previously defined groups, a group identifier corresponding to a key calculated from the attributes of all the stock market values of the group is calculated.

The contents of each group as well as the identifiers associated with each group are then sent to the remote workstation.

When the remote workstation requests a data update, for example when it connects to the distribution server, it sends all the identifiers for each of the groups as it last received them.

The server then proceeds to compare the identifiers received from the remote workstation with the potentially updated group identifiers if update data have modified the contents of the various groups.

The server then only sends the contents of the groups for which the group identifiers were modified by updating the data. It also sends the keys of the groups that were updated in order for it to be possible to repeat the method when a further request is received from the remote workstation.

BRIEF DESCRIPTION OF THE DRAWINGS

Further aims and advantages of the invention will appear from the description and appended drawings, wherein.

DETAILED DESCRIPTION OF THE INVENTION

Figure 1:
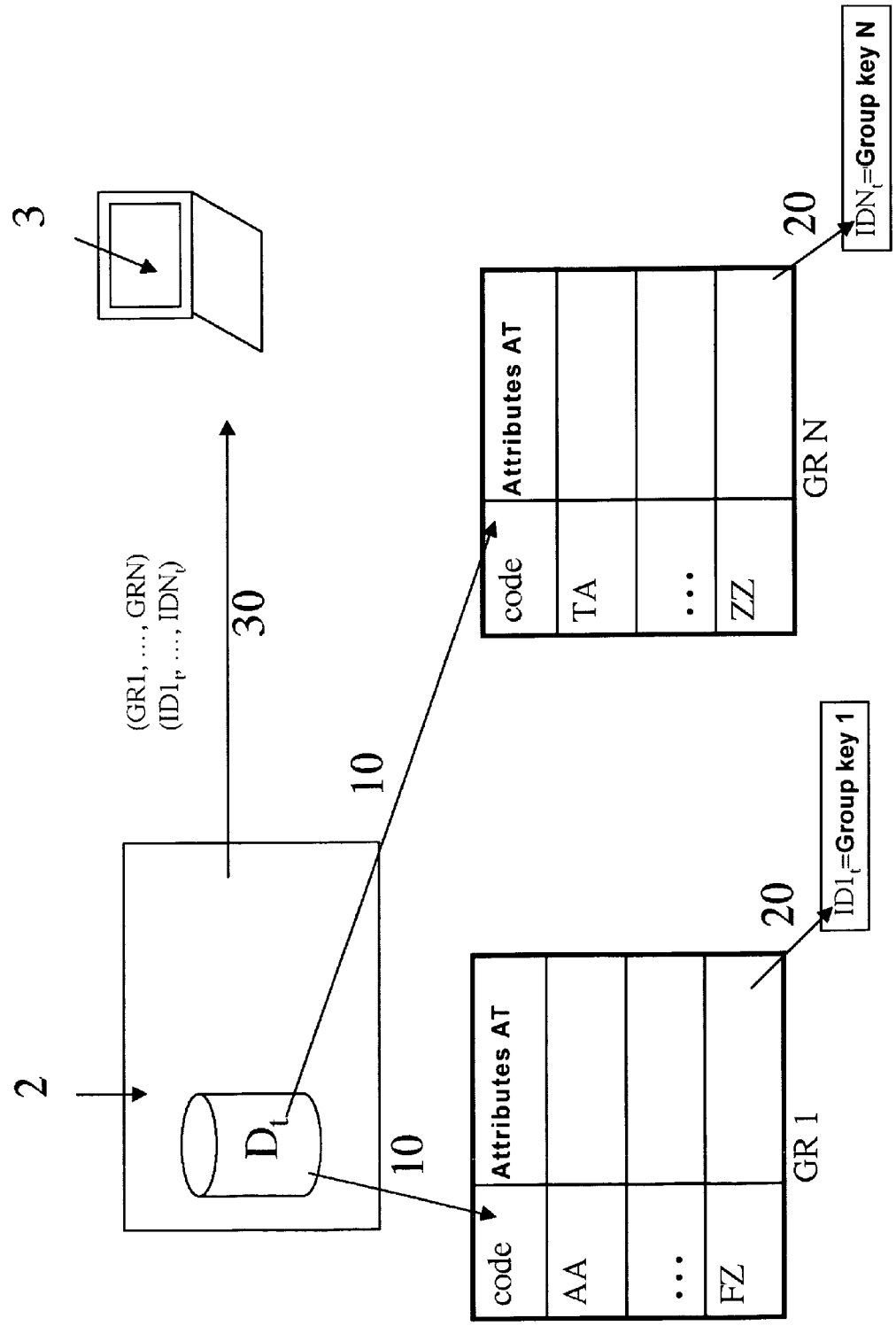
FIG. 1 shows an example of a sending step according to the invention.

As shown in FIG. 1 a distribution server 2 comprises a database of values at the instant t, $D_t$. Inside this database, these values can be represented in the form of a unique code corresponding to the value and a plurality of information relating to the value.

For the purpose of the present description, the term "value" can designate any data described by a plurality of attributes in a specific domain. As an example, in the field of the stock market, a "value" corresponds to a stock market instrument, such as the name of a company listed on the stock market. The unique code of this stock market instrument is then, for example, a two-figure code designating this instrument. In the standard fashion, for example, the letters AC can be used to designate the company "Accor".

The information on the value contains the static attributes of the value data that define the value, in addition to the unique code. In the field of the stock market, this information is, for example, the ISIN code, the listing group or the explanation. For the options, this can be the support, expiry, sense or strike data. For the strategies, it is possible to add the components of the index and their weight within the index.

When an attribute of a value is not entered, it is possible to assign it the numerical value "0" or the lexicographic character "space" for the purpose of the various calculations regarding the attributes.

The following different events can occur in a value:
creation of a value
deletion of a value
modification of the identifier of a value (corresponding in fact to a double step of deleting the value and creating a new value)
modification of at least one piece of information on the value.

According to the invention, data from the value database of the distribution server 2 are grouped together 10 in a plurality of groups of data GR1, . . . , GRN, according to the unique code associated with the values. As shown in FIG. 1, in the case of lexicographic identification of the values, this grouping can be carried out in a lexicographic fashion.

It is evident that the invention is not limited to lexicographic grouping and that any type of grouping that is suitable for the encoding type of the value can be used.

In FIG. 1, all the values having a lexicographic code comprised between AA and FZ are grouped together in the group GR1, and so on until the last group comprising the values having a lexicographic code comprised between TA and ZZ. It is evident that the group number and therefore the lexicographic segmentation can be adapted to the data transmission constraints.

For each group, the next step is to calculate 20 a group identifier at the instant t, $ID_t 1, ID_t 2, \ldots, ID_t N$. These group identifiers are calculated from the attributes AT of the values in each group. This identifier corresponds, for example, to a hashing key on all the attributes of the value. If one attribute is not entered for a value, the calculation of the identifier takes into account the default attribute "0" or "space" as defined previously.

Once these identifiers are calculated, all the groups GR1, . . . , GRN corresponding to the data $D_t$ at the instant t and all the identifiers $ID_t 1, \ldots, ID_t N$ are transmitted 30 to a client workstation 3.

This transmission step corresponds, in fact, to an initial sending step of the method in which all the data of the database for distribution to the client are transmitted. It is only during this prior step that all the data are transmitted to the client 3.

Figure 2:
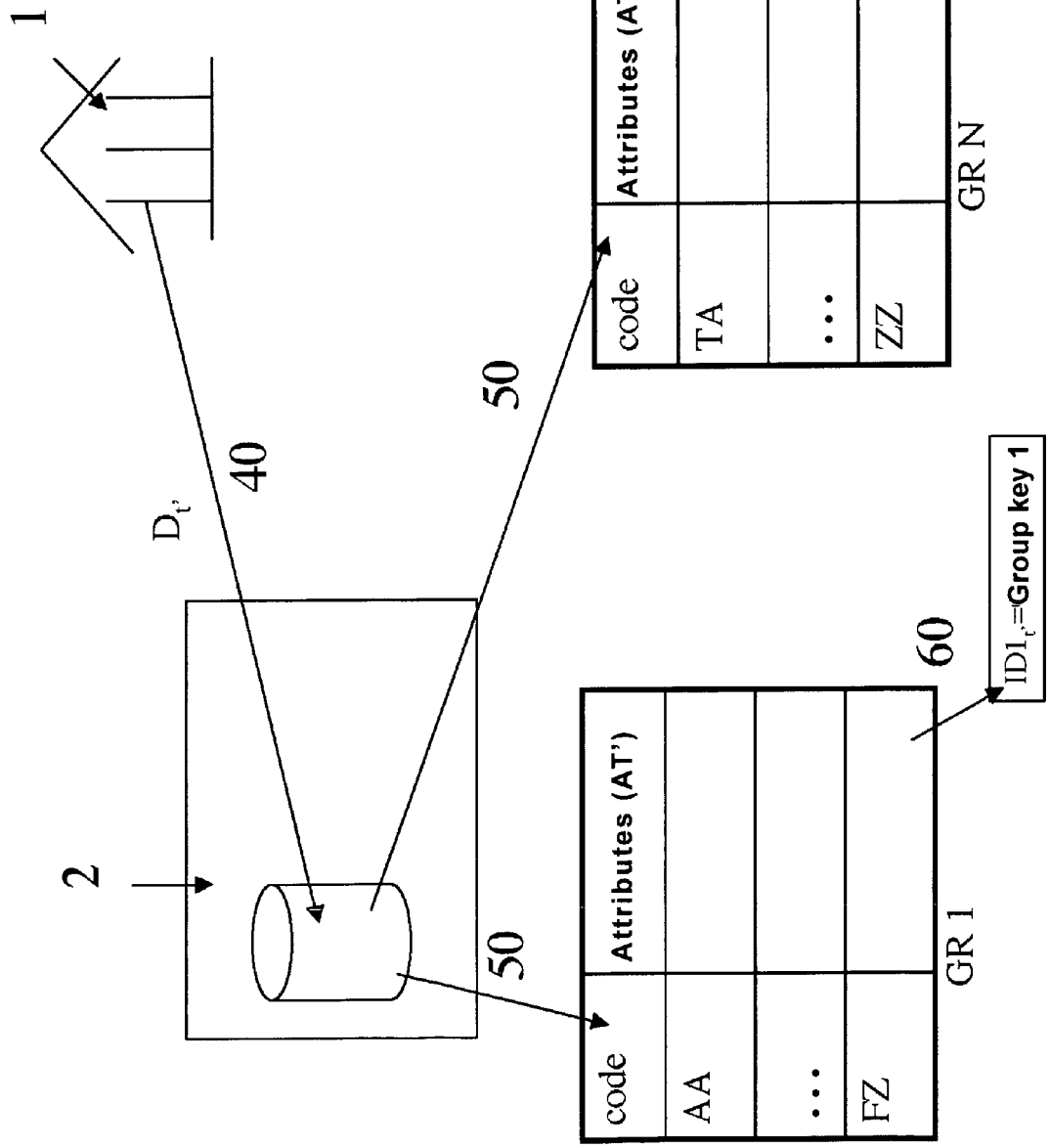
FIG. 2 shows an example of a transmission step according to the invention.

As shown next in FIG. 2, the data of the distribution server are updated 40 by receiving data issued by the stock market. At the instant t', the contents of the distribution server database therefore become $D_{t'}$.

The next step in the distribution server 2 is then to update 50 the information of the values within the groups GR1, . . . , GRN. As shown previously, this update can correspond to a value deletion, value modification, value insertion or value attribute modification.

In these data updated and grouped together in the groups GR1, . . . , GRN, the N identifiers of the group corresponding to the attributes updated at the instant t' are recalculated. In this way, the identifiers $ID_{t'} 1, \ldots, ID_{t'} N$ are obtained 60.

Figure 3:
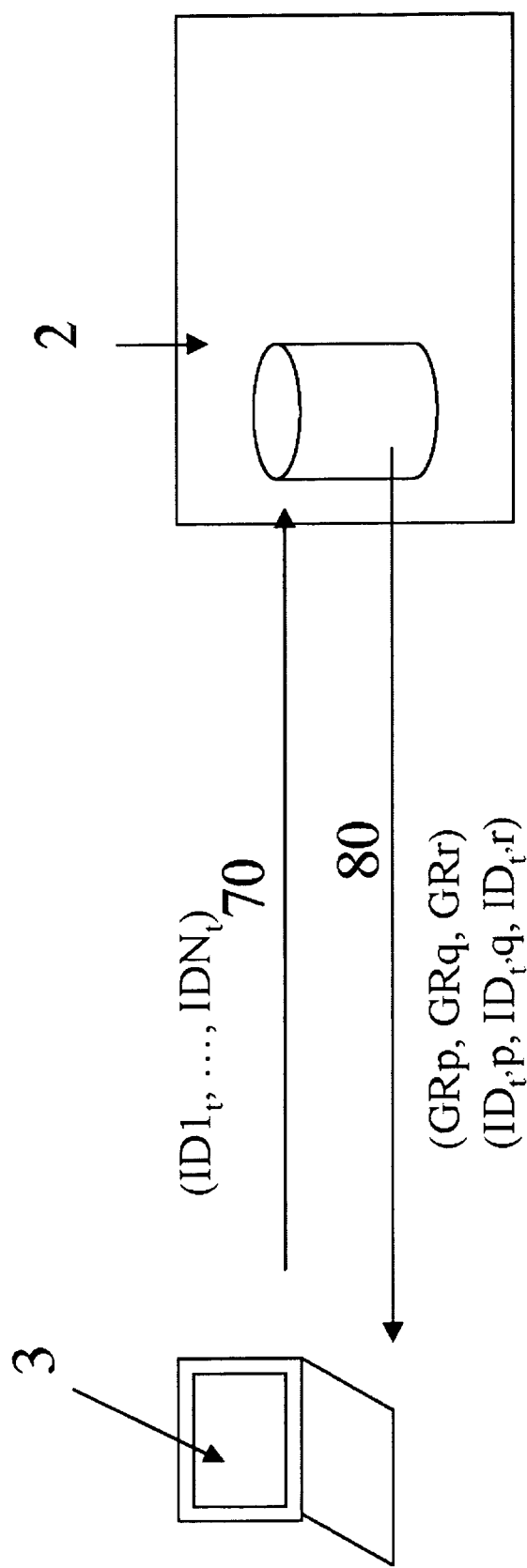
FIG. 3 shows an example of a comparison step according to the invention.

As shown next in FIG. 3, when the client makes a request in order to obtain updated data from the distribution server, this request must include 70 the list of recently received identifiers, in this case the identifiers $ID_t1, ID_t2, \ldots, ID_tN$. In this case, the client is supplied with a program that is capable of performing this transmission of identifiers in a transparent fashion, in addition to the data request. Those skilled in the trade will be capable of creating such a software program performing functions such as those described above. Upon receiving the identifiers $ID_t1, ID_t2, \ldots, ID_tN$, the distribution server compares these group identifiers with the potentially updated group identifiers $ID_{t'}1, \ldots, ID_{t'}N$.

If the two lists of group identifiers are identical, this means that none of the contents of any group have been modified. In this case, it is possible either not to send the client 3 anything, or to send an update clearing message, without transmitting the data contained in the groups $GR1, \ldots, GRN$.

If the two lists are different, the contents of at least one of the groups of data was modified between the instant t and the instant t'. The data were therefore truly updated, and $D_t$ is different from $D_{t'}$. According to the invention, the distribution server only sends the client the contents of the groups for which the group identifiers were modified. In this way, for example, if we only have $ID_tp, ID_{t'}p, ID_tq, ID_{t'}q$ and $ID_tr, ID_{t'}r$, then only the contents of the groups GRp, GRq and GRr will be transmitted 80 to the client.

Once again, those skilled in the trade will be able easily to implement a program performing the comparing and selective sending steps according to the invention, in the distribution server 2.

In this way, the sending of data not actually updated by the stock market is reduced, which reduces the amount of data transmitted between the distribution server 2 and the client 3. The number of groups can be chosen, for example, according to the attribute update frequency and the client request frequency. The number of groups is then adjusted according to statistical analyses of production flows.

The invention claimed is:

1. Data management method using a distribution server linked to a remote workstation, said distribution server comprising a first set of data, each of said data being associated with a data identifier and at least one attribute, said method comprising:
   a sending step comprising;
      grouping the data of said first set of data into at least one group of data according to said data identifier of each of said data of said first set of data;
      calculating, for each of said at least one group of data, one group identifier, according to said at least one attribute of each of said data grouped together inside said group of data;
      transmitting the data of each of said groups of data as well as each of said group identifiers to said remote workstation;
   an update step comprising;
      receiving a second set of data to update said first set of data in said distribution server, each of said update data being associated with a data identifier and at least one attribute;
      grouping the data of said second set of update data in said at least one group of data according to said data identifier of each of said data of said second set;
      calculating, for each of said at least one group of data, an updated group identifier according to said at least one attribute of each of said update data grouped together inside said group of data,
   a step of comparison, comprising the following sub-steps;
      transmitting, from said remote workstation to said distribution server, each of said data group identifiers received by said remote workstation during said sending step;
      comparing, by said distribution server, for each group of data, said data group identifier associated with said group of data with said updated data group identifier, associated with said group of data;
      transmitting, from said distribution server to said remote workstation, the contents of the group of data for which the data group identifier is different to the updated data group identifier.

* * * * *